United States Patent [19]

Szuhaj

[11] 3,928,056

[45] Dec. 23, 1975

[54] PAN RELEASE PRODUCT AND PROCESS

[76] Inventor: Bernard F. Szuhaj, 303 S. Brewster Ave., Lombard, Ill. 60148

[22] Filed: July 29, 1974

[21] Appl. No.: 492,763

[52] U.S. Cl. ............... 106/243; 117/167; 252/310; 260/403
[51] Int. Cl.² .......................................... C08H 9/00
[58] Field of Search ............ 260/403, 106; 106/243; 117/167

[56] References Cited
UNITED STATES PATENTS

| | | | |
|---|---|---|---|
| 2,362,080 | 11/1944 | Martin | 222/321 |
| 3,661,605 | 5/1972 | Rubin | 117/167 |
| 3,823,170 | 7/1974 | Seaberg et al. | 260/403 |

*Primary Examiner*—Theodore Morris

[57] ABSTRACT

A pan release product and process including a mechanical atomizer containing an aqueous suspension of modified lecithin having a reduced free amino nitrogen value and reduced iodine value (over crude lecithin) and wherein the release agent is atomized on a warm surface to evaporate the water.

5 Claims, No Drawings

PAN RELEASE PRODUCT AND PROCESS

BACKGROUND AND SUMMARY OF THE INVENTION

Conventional pan release agents are provided in aerosol containers. Exemplary of the prior art in this respect are U.S. Pat. Nos. 2,796,363 and 3,038,816 and Belgian Patent No. 742,244. The use of pressurized Freon type applicators is prohibited in some government institutions and some institutional kitchens. In any event, there is the ever present danger of explosion. Further, conventional aerosol containers have a somewhat undesirable odor, i.e., chloroform type fumes so that there is a degree of toxicity. The elimination of the aerosol type propellant would understandably make for a less expensive product as well as eliminate the other disadvantages described above.

However, heretofore, an inexpensive aqueous dispersion of lecithin for a pan release agent has not been available. Most lecithins are not readily dispersible in water. However, pan release agents do have a wide variety of uses. They may be used by the housewife, restaurants and institutional kitchens and large bakeries. Because of the demand for release agents, a variety are currently available but, as pointed out above, most are only available in carriers such as Freon type propellants. However, others have been available for a considerable period in waxes or vegetable oils. Illustrative of the latter in U.S. Pat. No. 2,559,481.

I have solved the problem of providing a water based lecithin pan release agent (so that it may be dispensed by mechanical application rather than a pressurized aerosol system) through the inclusion of a minor proportion of a modified or refined lecithin which is both acylated and hydroxylated as described in greater detail in the co-owned, copending application of Bernard F. Szuhaj and Joseph R. Yaste, Ser. No. 492,762, filed July 29, 1974. This release agent when mechanically atomized on a warm surface results in flash evaporation of the water. After use, the release agent is readily removed by simply washing the pan with water. Even further, the release agent of the invention may be used advantageously on food products directly, such as being sprayed on poultry.

Other details of the invention as well as advantages and objectives can be seen in the particulars of the ensuing specification.

DETAILED DESCRIPTION OF INVENTION

EXAMPLE

Illustrative of the practice of the invention is a product developed using a modified lecithin prepared according to the acylation-hydroxylation-neutralization procedure set forth in the abovementioned copending application of Szuhaj and Yaste. In the practice of this invention, in one embodiment, crude lecithin was sequentially acylated, hydroxylated and neutralized. Here, I use the term "lecithin" in its commercial sense as being concerned with phosphatides which are commercially available from vegetable sources rather than in its restrictive scientific meaning, phosphatidyl choline.

For this example, the suitable formulation of the modified lecithin involved weighing 400 grams of crude lecithin (available from Central Soya Company, Inc., Chicago, Illinois) into a three-neck, three-liter flask fitted with a crescent stirrer and thermometer. The lecithin was heated on a steam bath to 170°F and 12 grams of acetic anhydride added and reacted for 30 minutes at 170°F with stirring. Thereafter, 40 grams of 35% hydrogen peroxide was added and reacted at 170°F for 1 hour with stirring. Sodium hydroxide solution (50% concentration) was added in the amount of 8.8 grams which was adequate to neutralize the product while being mixed for ten minutes. Thereafter the product was vacuum dried to 185°–190°F and at about 28 inches vacuum. The hot product was then vacuum steam deodorized by the dropwise addition of 20% water and re-dried. The product was analyzed for free amino nitrogen value reduction (see U.S. Pat. No. 3,301,881) and iodine value reduction (see U.S. pat. No. 2,629,662). The free amino nitrogen percentage reduction was 84% while the iodine value percentage reduction was 15.7%.

Twelve percent by weight of the product was dispersed in water readily and the resulting dispersion was introduced into a mechanical atomizer of the type seen in U.S. Pat. No. 2,362,080.

To test the same, a 6 inch diameter black iron skillet was heated gently prior to the application of the release agent. The pan release agent was applied to the pan in a fine spray from a glass atomizer. The water almost immediately flash evaporated after which an egg was placed in the skillet and fried on both sides with no sticking. The egg was sampled and had no off flavors from the release agent. Greaseless cooking was accomplished with this release agent, and the pan was easily washed with water. Other foodstuffs were fried such as pancakes, French toast and potatoes with no sticking.

Other modified lecithin aqueous dispersions can be employed to advantage such as the other modified lecithin produced according to the abovementioned Szuhaj and Yaste application. A variety of acylated, hydroxylated, neutralized products can be used advantageously in the practice of the invention. Those especially useful have as the result of the acylating step the reduction of the free amino nitrogen value at least about 10% to about 90% and, as a result of the hydrolxylating step, a reduction in the iodine value from about 5% to about 10%. However, when either value is at the low end of the range, the other value should be relatively higher, i.e., when the free amino nitrogen value is in the range of 10–20% reduction, the iodine value reduction should be of the order of 20%. On the other hand, when the iodine value reduction is relatively low, i.e., of the order of 5–10%, the reduction of free amino nitrogen should be relative high, of the order of 60–90%.

Also, refined lecithins may be employed whereby a substantial part or all of the oil is removed. Additionally, the oil, when removed from the lecithin may be replaced by another diluent. I have found, however, that the optimum concentration of modified lecithin should be generally in the range of about 1% to about 25% and more advantageously in the range of about 10% to about 12%. Amounts substantially under 10% are essentially ineffective in that they require overwetting of the article to be coated with the release agent. Amounts substantially above 12% are not only uneconomical but when the percentage approaches 25% the viscosity is sufficiently high to make mechanical application difficult.

As indicated hereinbefore a variety of lecithins may be employed. In addition to lecithin stemming from soybean oil, lecithins from cottonseed oil, corn lecithin and other vegetable lecithins can be used if modified or refined as discussed hereinbefore. Also, the lecithins may be fortified to include color, flavor and odor such as with butter flavor, monosodium glutamate, and yellow coloring. Further, sodium benzoate may be added to retard mold growths.

I claim:

1. A pan release product comprising a mechanical atomizer containing an aqueous suspension of an acylated, hydroxylated lecithin, all of said lecithin being both acylated and hydroxylated, said acylation being carried out to reduce the free amino nitrogen value from about 10% to about 90% relative to crude lecithin, said hydroxylation being carried out with at least 1% hydrogen peroxide by weight of the unmodified lecithin to reduce the iodine value from about 5% to about 20% relative to crude lecithin.

2. The product of claim 1 in which the proportion of lecithin in the aqueous suspension is in the range of 1%–25%.

3. The product of claim 2 in which the range is between 10 and 12%.

4. A method of coating a vessel with a release coating comprising the steps of dispersing from about 10 to 25% of an acylated, hydroxylated, neutralized lecithin having mechanically atomizing the dispersion thus achieved onto a warmed cooking surface to flash evaporate the water in said dispersion.

5. The method of claim 4 in which the concentration of lecithin is between 10 and 12%.

* * * * *

UNITED STATES PATENT OFFICE
CERTIFICATE OF CORRECTION

Patent No. 3,928,056        Dated December 23, 1975

Inventor(s) Bernard F. Szuhaj

It is certified that error appears in the above-identified patent and that said Letters Patent are hereby corrected as shown below:

Title Page: assignee omitted -- Central Soya Company, Inc. --

Signed and Sealed this eighteenth Day of May 1976

[SEAL]

Attest:

RUTH C. MASON
*Attesting Officer*

C. MARSHALL DANN
*Commissioner of Patents and Trademarks*